(12) United States Patent
Goto (10) Patent No.: US 12,115,932 B2
(45) Date of Patent: Oct. 15, 2024

(54) VEHICLE CONTROL DEVICE (71) Applicant: DENSO CORPORATION, Kariya (JP)

(72) Inventor: Toshiyuki Goto, Kariya (JP)

(73) Assignee: DENSO CORPORATION, Kariya (JP)

( * ) Notice: Subject to any disclaimer, the term of this patent is extended or adjusted under 35 U.S.C. 154(b) by 767 days.

(21) Appl. No.: 16/950,587

(22) Filed: Nov. 17, 2020

(65) Prior Publication Data

US 2021/0061222 A1 Mar. 4, 2021

Related U.S. Application Data

(63) Continuation of application No. PCT/JP2019/020338, filed on May 22, 2019.

(30) Foreign Application Priority Data

May 23, 2018 (JP) ................................ 2018-098990

(51) Int. Cl.
*B60R 25/20* (2013.01)
*H04W 4/40* (2018.01)

(52) U.S. Cl.
CPC ............. *B60R 25/209* (2013.01); *H04W 4/40* (2018.02)

(58) Field of Classification Search
CPC .................................................. B60R 25/209
See application file for complete search history.

(56) References Cited

U.S. PATENT DOCUMENTS

| | | | | |
|---|---|---|---|---|
| 6,191,703 B1* | 2/2001 | Wallace | .................. | B60R 25/24 |
| | | | | 340/5.1 |
| 9,576,306 B2* | 2/2017 | Davis, III | .............. | G06Q 30/04 |
| 2007/0276572 A1* | 11/2007 | Siemer | .................. | G07C 5/008 |
| | | | | 701/1 |
| 2015/0028995 A1* | 1/2015 | Gautama | ............ | G07C 9/00944 |
| | | | | 340/5.72 |

FOREIGN PATENT DOCUMENTS

| | | | |
|---|---|---|---|
| JP | 2004145479 A | | 5/2004 |
| JP | 2008001153 A | | 1/2008 |
| JP | 2008065483 A | | 3/2008 |
| JP | 2013117472 A | | 6/2013 |
| JP | 2014081872 A | | 5/2014 |
| JP | 2016018407 A | | 2/2016 |
| JP | 2017093066 A | * | 5/2017 |

* cited by examiner

*Primary Examiner* — Benyam Haile
(74) *Attorney, Agent, or Firm* — Harness, Dickey & Pierce, P.L.C.

(57) ABSTRACT

A vehicle control device mounted to a vehicle is provided. The vehicle control device causes a transmitter to output a search radio wave, and determines whether a predetermined identification signal from a portable device carried by a user of the vehicle is received by a receiver. When the vehicle control device determines that the identification signal is received by a receiver, the vehicle control device specifies that the portable device is located within a reception range from the vehicle. When the portable device is specified as being located within the reception range from the vehicle, the vehicle control device outputs a supply instruction to an electric power supply unit that supplies electric power to a predetermined execution device mounted to the subject vehicle according to the supply instruction.

6 Claims, 4 Drawing Sheets

VEHICLE CONTROL DEVICE

CROSS-REFERENCE TO RELATED APPLICATIONS

This application is a continuation application of PCT/JP2019/020338 filed on May 22, 2019, which designated the U.S and claims the benefit of priority from Japanese Patent Application No. 2018-98990 filed on May 23, 2018. The entire disclosures of all of the above applications are incorporated herein by reference.

TECHNICAL FIELD

The present disclosure relates to a technology for starting up a predetermined device mounted to a vehicle.

BACKGROUND

There is a proposed technology to improve safety called V2X which performs vehicle-to-vehicle communications and/or vehicle-to-infrastructure communications for information sharing of information on movable objects and obstacles on roads obtained from sensors of vehicles and roadway infrastructure.

V2X is an abbreviation for Vehicle to X. The X herein may include roadway infrastructure, a pedestrian, a vehicle, etc. The improvement in safety mentioned above may include, for example, suppressing encounter collision accidents.

SUMMARY

One aspect of the present disclosure is a vehicle control device mounted to a subject vehicle. The vehicle control device causes a transmitter to output a search radio wave, and repeatedly determines whether a predetermined identification signal from a portable device carried by a user of the subject vehicle is received by a receiver, the portable device being configured to transmit the identification signal in response to receiving the search radio wave. When it is determined that the identification signal is received, the vehicle control device specifies that the portable device is located within a reception range from the subject vehicle. When the portable device is specified as being located within the reception range from the subject vehicle, the vehicle control device outputs a supply instruction to an electric power supply unit that supplies electric power to a predetermined execution device mounted to the subject vehicle according to the supply instruction.

DETAILED DESCRIPTION

There is a proposed technology to improve safety called V2X. It may be preferable that a vehicle-to-vehicle communication device promptly operate after start of a driving operation, which driving operation is, for example, an ignition switch operation by a user. This is because this makes it possible to suppress encounter collision accidents even in cases where the vehicle starts moving immediately after the driver turns on the ignition switch. However, as a result of detailed study by the inventor, such a problem was found that it takes time for the vehicle-vehicle communication device to operate in the described way after the start of the driving operation.

One aspect of the present disclosure is preferably to provide a technology capable of promptly operating a predetermined device such as the vehicle-to-vehicle communication device described above after start of a driving operation of a vehicle.

One aspect of the present disclosure is a vehicle control device that is mounted to a vehicle, and that includes a transmission instruction unit, a portable device detection unit, and a supply instruction unit. The transmission instruction unit is configured to cause a transmitter to output a search radio wave, the search radio wave being a radio wave having a predetermined frequency. The portable device detection unit is configured to: repeatedly determine whether a predetermined identification signal from a portable device carried by a user of a subject vehicle being the vehicle to which the vehicle control device is mounted is received by a receiver, the portable device being configured to transmit the identification signal in response to receiving the search radio wave; and, when it is determined that the identification signal is received, specify that the portable device is located within a reception range being a given range from the subject vehicle. The supply instruction unit is configured to, when the portable device is specified as being located within the reception range from the subject vehicle, output a supply instruction to an electric power supply unit that supplies electric power to a predetermined execution device mounted to the subject vehicle according to the supply instruction.

It is typical that electric power is supplied to an execution device after a user of a subject vehicle gets into vehicle interior and starts a driving operation of the vehicle by an ignition switch or the like, and the execution device starts operating after elapse of a predetermined time period necessary for supplying of the electric power to the execution device, startup of the execution device, etc.

On the other hand, in the above-mentioned vehicle control device, the electric power is supplied to the execution device when the portable device is specified as being located within the reception range from the subject vehicle, in other words, before the user gets into the vehicle interior. As a result, when the user of the subject vehicle getting into the vehicle interior starts a driving operation of the vehicle, the electric power has been already supplied to the execution device and the time has passed since the supplying of the electric power, and therefore, it is possible to promptly operate the execution device after the driving operation is started.

Hereinafter, illustrative embodiments of the present disclosure will be described with reference to the drawings.

1. Configuration

<1-1. Overall Configuration>

Figure 1:
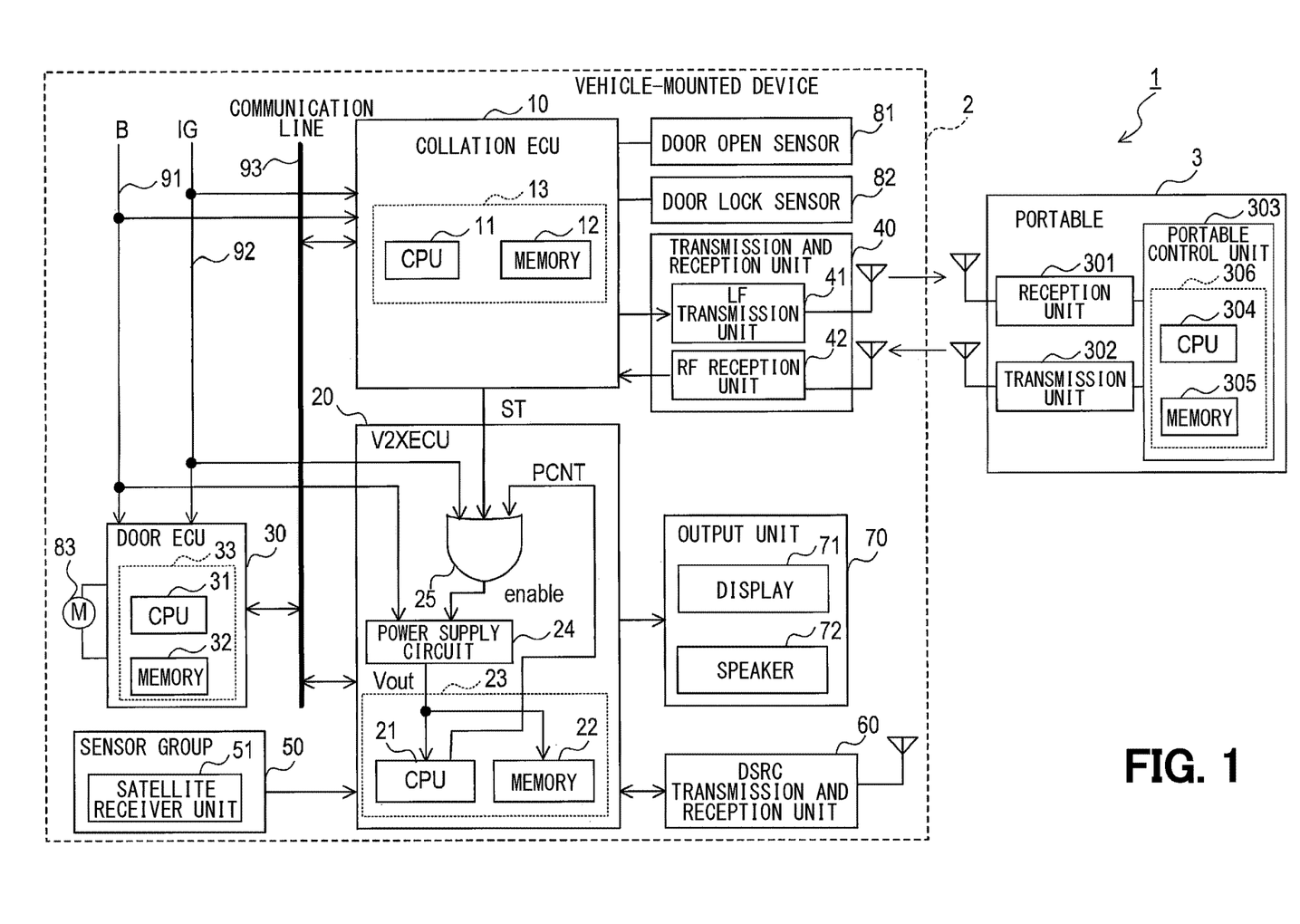
FIG. 1 is a block diagram illustrating a configuration of a vehicle control system.

A vehicle control system 1 shown in FIG. 1 includes a vehicle-mounted device 2 mounted to a vehicle and a portable device 3 carried by a user of the vehicle 9 to which the vehicle-mounted device 2 is mounted (hereinafter, also referred to as subject vehicle). The vehicle control system 1 has a function of performing at least one of: communications between the subject vehicle 9 and a different vehicle (hereinafter, vehicle-to-vehicle communication); and communications between the subject vehicle 9 and an infrastructure device (hereinafter, vehicle-to-infrastructure communication). In the present embodiment, the vehicle control system 1 has both functions of the vehicle-to-vehicle communication and the vehicle-infrastructure communication. Further, the vehicle control system 1 has a function of performing, with the portable device 3, unlocking and locking a door of the subject vehicle 9 and starting an engine of the vehicle 9 without direct insertion of a mechanical key into the vehicle 9 (hereinafter, smart entry function).

<1-2. Vehicle-Mounted Device>

The vehicle-mounted device 2 includes a collation ECU 10 and a V2X ECU 20. ECU is an abbreviation for Electronic Control Unit. The vehicle-mounted device 2 may include a door ECU 30. The vehicle-mounted device 2 may include a sensor group 50 and a DSRC transmission and reception unit 60. The vehicle-mounted device 2 may include a transmission and reception unit 40, a door open sensor 81, and a door lock sensor 82. DSRC is an abbreviation for Dedicated Short Range Communications. DSRC is a registered trademark.

The collation ECU 10, the V2X ECU 20, and the door ECU 30 are connected by a common communication line 93 to form a communication network. The collation ECU 10, the V2X ECU 20, and the door ECU 30 each functions as a node of the communication network, and performs communications according to a predetermined communication protocol such as CAN, LIN, or the like. CAN is a registered trademark.

Electric power is supplied to the collation ECU 10, the V2X ECU 20, and the door ECU 30 from a battery (not shown) via a power line 91. Specifically, a battery voltage B is supplied via the power line 91. Further, an ignition signal (hereinafter, IG signal) is supplied to the collation ECU 10, the V2X ECU 20, and the door ECU 30 via a signal line 92.

The IG signal is a signal representing two states such as on and off. Specifically, the IG signal is a binary signal such as a high level and a low level. The IG signal is output when a user 100 of the subject vehicle 9 starts a driving operation. The IG signal is output as continuously having the high level, for example, during a period from when a predetermined start button for starting the engine is pressed by the user of the subject vehicle 9 to when the predetermined start button is pressed again, or during a period from when an ignition switch is turned on by the user of the subject vehicle 9 to when the ignition is turned off.

In the following, output of the signal having the high level is simply referred to as output of the signal. Other than the above-described period, the IG signal has the low level. In the following, output of the signal having the low level is referred to as non-output of the signal.

The sensor group 50, the DSRC transmission and reception unit 60, and an output unit 70 are connected to the V2X ECU 20.

The sensor group 50 includes various devices and/or sensors that acquire various information necessary for detecting a behavior of the subject vehicle 9 and a surrounding environment of the subject vehicle 9. The sensor group 50 outputs various information to the V2X ECU 20. The various information is used by the V2X ECU 20 to generate subject vehicle information. The subject vehicle information is information representing a traveling state of the subject vehicle 9. Specifically, the sensor group 50 may include a satellite receiver unit 51, a radar sensor, a vehicle speed sensor, an acceleration sensor, etc.

The radar device may be, for example, a millimeter wave sensor, a Lidar, a sound wave sensor, or the like. The radar device detects an object around the subject vehicle 9. The satellite receiver unit 51 receives signals from a quasi-zenith satellite and GPS satellites that constitute a satellite positioning system (hereinafter, GNSS). The vehicle speed sensor outputs a detection signal for detection of vehicle speed of the subject vehicle 9. The acceleration sensor outputs an acceleration detection signal for detection of acceleration of the subject vehicle 9. A camera may be included in the sensor group 50. The camera may be installed so as to image an area in a heading direction of the subject vehicle 9 including a road surface, and may be configured to output image data.

In the present embodiment, the DSRC transmission and reception unit 60 performs the vehicle-to-vehicle communication and the vehicle-to-infrastructure communication. The DSRC transmission and reception unit 60 enables two-way short-range wireless communication by using radio waves in a microwave band. The microwave may be, for example, a radio wave of a few GHz. A communication range of the DSRC transmission and reception unit 60 is set to a radius of several tens of meters to several hundreds of meters.

Specifically, the DSRC transmission and reception unit 60 performs communications with the infrastructure device and the different vehicle existing within a radius of several tens of meters to several hundreds of meters from the subject vehicle. The infrastructure device may include, for example, a traffic signal equipped with a wireless device to transmit traffic signal information, etc.

The DSRC transmission and reception unit 60 directly transmits the subject vehicle information to the different vehicle. Further, the DSRC transmission and reception unit 60 transmits the subject vehicle information to the different vehicle by utilizing the infrastructure device. Further, the DSRC transmission and reception unit 60 receives information representing a traveling state of a different vehicle (hereinafter, different vehicle information) from at least one of: the different vehicle; and the infrastructure device. The subject vehicle information transmitted from the subject vehicle 9 and received by a different vehicle is recognized as different vehicle information by the different vehicle.

The output unit 70 includes a display 71 and a speaker 72. The display 71 displays an image according to an instruction from the V2X ECU 20. The speaker 72 outputs sound according to an instruction from the V2X ECU 20.

The transmission and reception unit 40, the door open sensor 81, and the door lock sensor 82 are connected to the collation ECU 10. The transmission and reception unit 40 includes an LF transmission unit 41 and an RF reception unit 42.

The LF transmission unit 41 is configured to output a search radio wave with such an intensity according to an instruction from the collation ECU 10 that it is receivable within a reception range R set to an inside and an outside of the subject vehicle 9. The search radio wave now referred to is a radio wave having a predetermined frequency, and in the present embodiment, is a radio wave in a LF band (hereinafter, LF wave). The LF wave may be a low frequency radio wave of, for example, about several tens of kHz to one hundred and several tens of kHz.

The RF reception unit 42 receives an identification signal wirelessly transmitted from the portable device 3. The RF reception unit 42 is configured to be able to receive a radio wave (hereinafter, RF wave) having a predetermined frequency in a UHF band. The RF wave can be a high frequency radio wave of, for example, about several hundred MHz.

Figure 2:
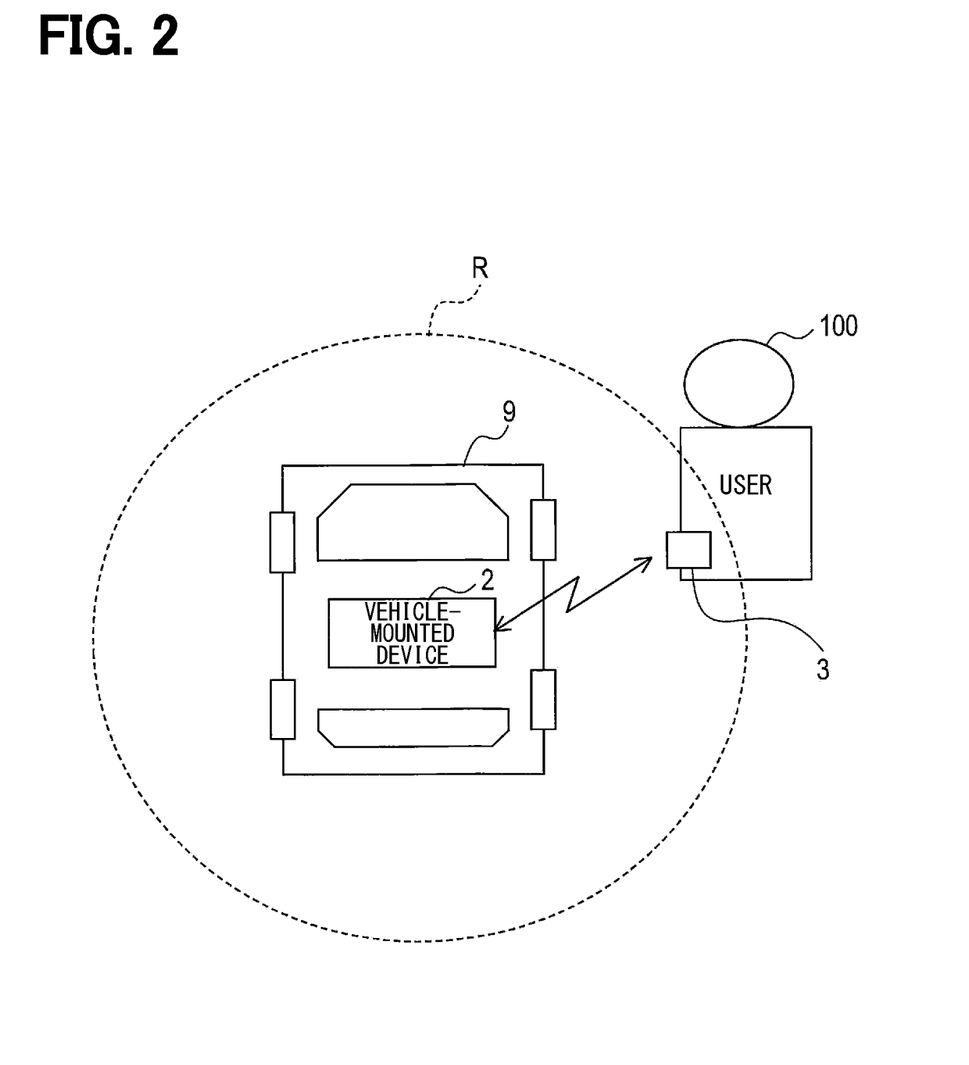
FIG. 2 is an explanatory diagram illustrating a state in which a portable device is detected.

Now, the portable device 3 will be described. The portable device 3 is configured to transmit the identification signal in response to receiving the LF wave. In other words, as shown in FIG. 2, when the portable device 3 is located within the reception range R from the subject vehicle 9, the portable device 3 is configured to modulate an identification signal using the RF wave as a carrier wave and transmits the identification signal. Specifically, the portable device 3 includes a portable control unit 303, as shown in FIG. 1. The portable control unit 303 comprises a microcomputer 306 including a CPU 304 and a memory 305.

When the portable control unit 303 receives via a reception unit 301 the LF wave that has a reception strength equal to or larger than a predetermined strength threshold value, the portable control unit 303 causes the identification signal to be transmitted using the transmission unit 302. When the identification signal is output from the portable control unit 303, the transmission unit 302 performs modulation using the RF wave as a carrier wave and transmits the identification signal. A modulation method may include FM modulation, AM modulation.

The identification signal is a predetermined signal and includes at least a user ID. The user ID is a predetermined recognition code assigned for each vehicle control system 1 and is stored in the memory 305.

When the RF reception unit 42 receives the RF wave wirelessly transmitted from the above-configured portable device 3, the RF reception unit 42 performs demodulation to acquire the identification signal, and outputs the identification signal to the collation ECU 10.

The door open sensor 81 is a touch sensor provided on the door of the subject vehicle 9. The user 100 touches the door open sensor 81 for unlocking the door, specifically, when unlocking the door.

The door lock sensor 82 is a touch sensor provided on the door of the subject vehicle 9. The user 100 touches the door lock sensor 82 for locking the door of the subject vehicle 9, specifically, when locking the door.

A door lock motor 83 is connected to the door ECU 30. The door lock motor 83 performs locking and unlocking the door of the subject vehicle 9 according to the instruction from the door ECU 30.

Each of the collation ECU 10, the V2X ECU 20, and the door ECU 30 comprises a microcomputer including a CPU and a semiconductor memory (hereinafter, memory) such as RAM, ROM, etc. Specifically, the collation ECU 10 includes a microcomputer 13, and the microcomputer 13 includes a CPU 11 and a memory 12. The V2X ECU 20 includes a microcomputer 23, and the microcomputer 23 includes a CPU 21 and a memory 22. The door ECU 30 includes a microcomputer 33, and the microcomputer 33 includes a CPU 31 and a memory 32.

Various functions of each of the collation ECU 10, the V2X ECU 20, and the door ECU 30 are performed by the CPU 11, 21, 31 of a respective ECU executing a program stored in the non-transitory tangible storage medium. In this example, a respective memory 12, 22, and 32 corresponds to a non-transitory tangible storage medium storing a program. Further, by executing this program, a method corresponding to the program is executed. It is noted that a respective ECU may include one microcomputer, or a plurality of microcomputers.

In a respective ECU, a way to implement various functions are not limited to software, and some or all of the functions may be implemented by using one or more hardware features. For example, in cases where the above function is implemented by an electronic circuit being hardware, the electronic circuit may be implemented by a digital circuit, an analog circuit, or a combination of these.

<1-3. Door ECU>

The door ECU 30 is configured to perform a function of driving and controlling the door lock motor 83 for locking and unlocking the door of the subject vehicle 9 while the subject vehicle 9 is being set to an operable state. The operable state means a state in which operations such as unlocking, locking, and starting the engine are available. Specifically, in the operable state, electric power is supplied at least to the door ECU 30 and the door lock motor 83.

When it is detected in the operable state that, for example, the user 100 touches the door open sensor 81 provided on the handle of the door, the door ECU 30 outputs an instruction to unlock the door to the door unlock motor 83. Further, when it is detected in the operable state that the user 100 touches the door lock sensor 82 provided on the door handle, the door ECU 30 outputs an instruction to lock the door to the door lock motor 83.

<1-4. V2X ECU>

The V2X ECU 20 further includes a logical disjunction circuit 25 and a power supply circuit 24 in addition to the microcomputer 23, specifically, the CPU 21 and the memory 22.

The logical disjunction circuit 25 is configured to output an enable signal to the power supply circuit 24 when at least a start trigger (hereinafter, ST) signal is input. The ST signal is a signal output from the collation ECU 10 as described later.

In the present embodiment, the logical disjunction circuit 25 is configured to output the enable signal to the power supply circuit 24 when at least one of an ST signal, an IG signal, and a power control signal (hereinafter referred to as a PCNT signal) is input.

The PCNT signal is a signal output based on a process-at-startup executed by the microcomputer 23. The process-at-startup will be described later. The PCNT signal is a signal that is asserted while the IG signal is being output, or until a time period during which the IG signal is not output after the electric power is supplied to the microcomputer 23 reaches an allowable threshold value described later.

A purpose of this signal is to keep, when the IG signal or ST signal is negated, the output Vout of the power supply circuit 24 enabled. If it is assumed that this signal is not present, there is a concern that the output Vout of the power supply circuit 24 may become disabled immediately upon the IG signal or ST signal being negated, and the CPU 21 may stop. It is required that when the IG signal or ST signal is negated, the CPU 21 perform a process of writing various information such as the position of the subject vehicle into a ROM or the like, and therefore it is necessary to retain the power until this process is completed.

Note that the asserting of a signal means that the signal is made valid, and in this, it refers to output of a high-level signal. The negating of a signal means that the signal is made invalid, and in this, it refers to output of a low level signal.

The power supply circuit 24 is connected to the power line 91. The power supply circuit 24 enables the output Vout while the enable signal is being input from the logical disjunction circuit 25, and disables the output Vout while the enable signal is not being input from the logical disjunction circuit 25. Specifically, the power supply circuit 24 is configured to supply the battery voltage B as the output Vout to the microcomputer 23 via the power line 91 only while the enable signal is being input.

In other words, at least according to the ST signal input from the collation ECU 10, the power supply circuit 24 is configured to supply electric power to the microcomputer 23 while the ST signal is being output. In the present embodiment, electric power is always supplied to the logical disjunction circuit 25 and the power supply circuit 24 via the power line 91.

The V2X ECU 20 is configured so that the CPU 21 executes the process-at-startup described later, and thereby a predetermined designated function is executed according to output of a startup signal when the microcomputer 23 starts being supplied with electric power. The process-at-startup will be described later.

Further, the CPU 21 in the V2X ECU 20 is configured to implement a function of, every several msec to 100 msec while electric power is being supplied to the microcomputer 23, generating the subject vehicle information based on the various information output from the sensor group 50 and transmitting the generated subject vehicle information to the DSRC transmission and reception unit 60.

Specifically, the CPU 21 executes a process of generating position information representing the current position of the subject vehicle 9 based on the signal received from the satellite receiver unit 51. The position information can be represented by latitude, longitude, altitude, etc. Further, for example, the CPU 21 executes a process of generating information on an object around the subject vehicle (hereinafter, object detection information) based on the detection result of the radar device. Further, the CPU 21 executes a process of generating vehicle speed information representing the vehicle speed of the subject vehicle 9 based on the vehicle speed detection signal.

Further, the CPU 21 executes a process of generating acceleration information representing the acceleration of the subject vehicle 9 based on the acceleration detection signal. The object detection information may include a distance from the subject vehicle 9 to the object, an orientation of the object with respect to the subject vehicle 9, etc. The subject vehicle information generated by the CPU 21 may include the position information, the object detection information, the vehicle speed information, the acceleration information, and the like as information representing the traveling state of the subject vehicle.

Further, the CPU 21 is configured to implement a function of, for example, every several msec to several hundred msec, acquiring the different vehicle information from a different vehicle or an infrastructure device by the DSRC transmission and reception unit 60.

Further, the CPU 21 is configured to calculate a possibility of collision between the subject vehicle 9 and the different vehicle based on the generated subject vehicle information and the acquired different vehicle information. For example, the CPU 21 calculates a time-to-collision between the subject vehicle 9 and the different vehicle based on the distance from the subject vehicle 9 to the different vehicle, the heading directions of the subject vehicle 9 and the different vehicle, the vehicle speeds of the subject vehicle 9 and the different vehicle, etc.

Further, the CPU 21 is configured to implement a function of, according to a result of the calculating, outputting an instruction that causes the output unit 70 to issue a notification for the driver to avoid the collision. The CPU 21 may be configured to cause the display 71 to display an image for the notification, and/or may be configured to cause the speaker 72 to output a sound for the notification.

<1-5. Collation ECU>

At least the above-mentioned user ID is stored in the memory 12 of the collation ECU 10.

The CPU 11 in the collation ECU 10 executes a collation process, thereby causing the LF wave being the search radio wave to be output at a given cycle. Further, by executing the collation process, the CPU 11 is configured to cause electric power to be supplied to the execution device when a given condition is satisfied. The execution device is a predetermined device mounted to the subject vehicle 9. The collation process will be described later.

Further, the collation ECU 10 is configured to implement a function of, in the operable state, starting the engine when a specific start button in the vehicle interior is pressed by the user 100.

The CPU 11 in the collation ECU 10 may be configured to implement such a function that when the identification signal including the user ID is received from the portable device 3, the CPU 11 collates it with the user ID registered in advance in the memory 12, and causes the subject vehicle 9 to be in the operable state if these user IDs match.

The collation ECU 10 is always supplied with the battery voltage B via the power line 91.

2. Processing

<2-1. Collation Process>

Figure 3:
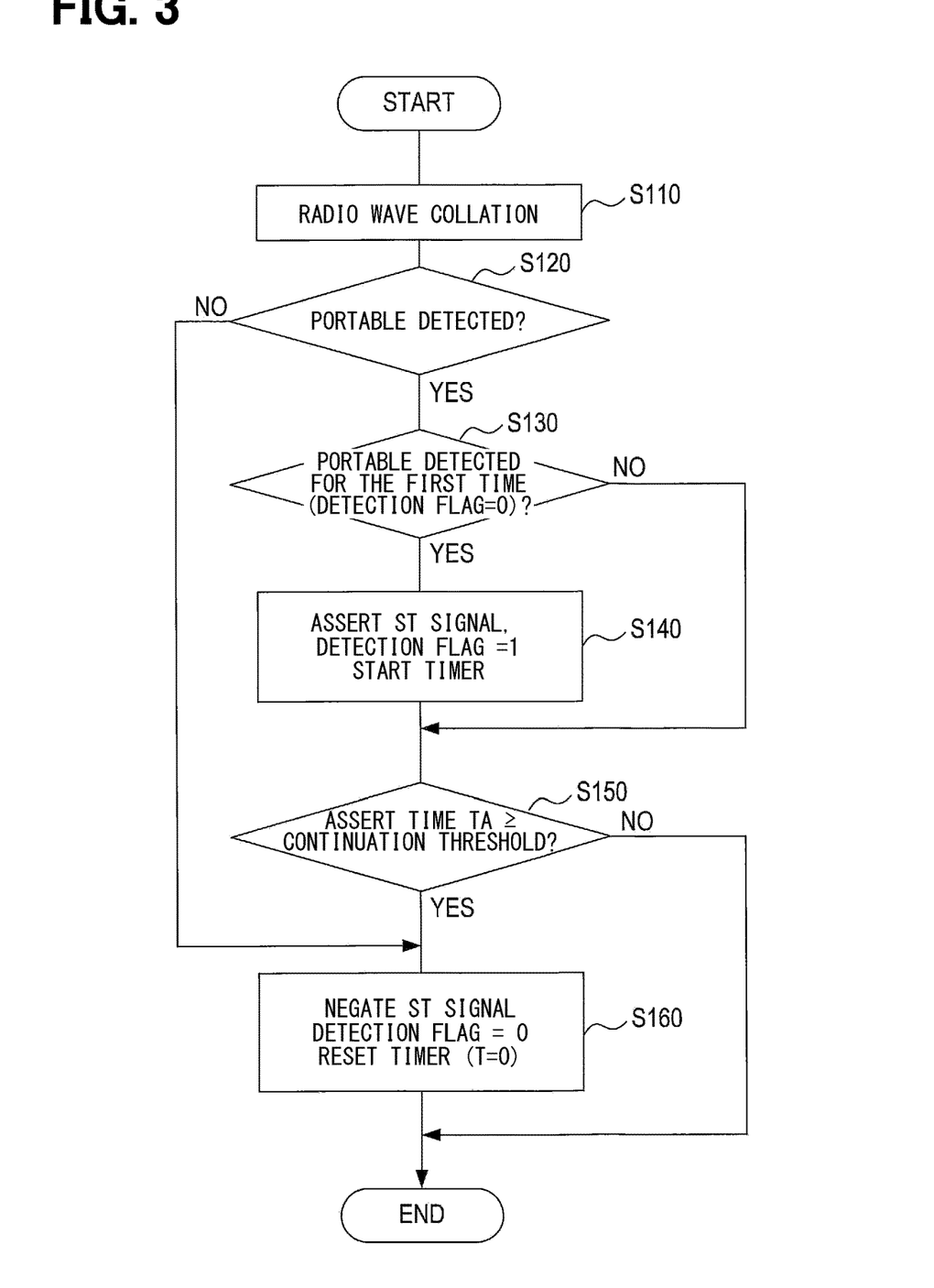
FIG. 3 is a flowchart of a collation process.

Next, the collation process executed by the CPU 11 in the collation ECU 10 will be described with reference to the flowchart of FIG. 3. The collation process is a process for, when it is detected that the portable device 3 is within a given reception range R from the subject vehicle 9, outputting a supply instruction to an electric power supply unit that supplies the electric power to the execution device. This causes the electric power to be supplied to the execution device. The supply instruction is an instruction for causing the electric power supply unit to supply the electric power to the execution device. The electric power supply unit is a device for supplying the electric power to the execution device.

In the present embodiment, the execution device acquires the subject vehicle information being the information on the subject vehicle 9, and causes the DSRC transmission and reception device 60 to transmit the subject vehicle information to at least one of: a different vehicle located around the subject vehicle 9; and roadside equipment located around the subject vehicle 9. The roadside equipment is the above-mentioned infrastructure device. Specifically, in the present embodiment, the microcomputer 23 corresponds to the execution device, the power supply circuit 24 corresponds to the electric power supply unit, and the ST signal corresponds to the supply instruction.

The collation process is repeatedly executed at a given execution cycle, for example, several msec to several hundred msec.

The CPU 11 executes radio wave collation in S110. Specifically, the CPU 11 outputs an instruction for causing the LF transmission unit 41 to transmit the LF wave being a search radio wave. As a result, the LF wave is transmitted at a predetermined execution cycle. As described above, when the portable device 3, which is carried by the user of the subject vehicle 9, receives the LF wave transmitted from the vehicle-mounted device 2, the portable device 3 transmits the identification signal including the user ID by using the RF wave as a carrier wave, the RF wave being a radio wave that is higher in frequency than the LF wave.

The CPU 11 repeatedly determines whether or not the identification signal is received from the portable device 3 by the RF reception unit 42, and when it is determined that the identification signal is received, the CPU 11 specifies that the portable device 3 is located within a given reception range R from the subject vehicle 9. Further, the CPU 11 determines whether or not the user ID included in the identification signal received from the portable device 3 and the user ID stored in advance in the memory 12 match.

When these user IDs match, the CPU 11 specifies that the portable device 3 corresponding to the subject vehicle 9 is located within the reception range R. The portable device 3 corresponding to the subject vehicle 9 means the portable device 3 registered in advance for the vehicle control system 1. In the following, when it is described such that the portable device 3 is detected, it means that the portable device 3 corresponding to the subject vehicle 9 is located within the reception range R from the subject vehicle 9.

In S120, the CPU 11 determines whether or not the portable device 3 is detected. The CPU 11 shifts the process to S130 when it is determined that the portable device 3 is detected, and shifts the process to S160 when it is determined that the portable device 3 is not detected.

In S130, the CPU 11 determines whether or not the portable device 3 is detected for the first time. The detecting of the portable device 3 for the first time in the above includes the detecting of the portable device 3 when the portable device 3 enters into the reception range R from the outside of the reception range R, and includes the detecting of the portable device 3 after the assert time described later exceeds a continuation threshold value. Specifically, the CPU 11 determines whether or not a detection flag is set to a reset value, and determines that the portable device 3 is detected for the first time when the detection flag is set to the reset value. The detection flag is a flag whose initial value is set to the reset value and is set to a set value different from the reset value while the portable device 3 is being detected. For example, the reset value may be 0 and the set value may be 1. The detection flag is stored in the memory 12.

Now, when the detection flag is set to the reset value and it is determined that the portable device 3 is detected, the CPU 11 determines that the portable device 3 is detected for the first time, and the CPU 11 sets the detection flag to the set value and shifts the process to S140. On the other hand, when the detection flag is set to the set value, the CPU 11 determines that the portable device 3 has already been detected and the portable device 3 is continuously detected, and shifts the process to S150.

Further, in this step, the CPU 11 outputs a supply instruction to the electric power supply unit. The above-mentioned execution device is configured to be supplied with electric power from the electric power supply unit according to the supply instruction, when the portable device 3 is specified as being located within the reception range R from the subject vehicle 9.

Specifically, the CPU 11 outputs the ST signal to the power supply circuit 24. In the present embodiment, the CPU 11 asserts the ST signal and outputs the ST signal to the V2X ECU 20, specifically, to the logical disjunction circuit 25. As described above, the logical disjunction circuit 25 outputs the enable signal while the ST signal is being asserted. While the enable signal is being input, the power supply circuit 24 supplies the electric power to the microcomputer 23.

Specifically, at least while the ST signal is being output, the power supply circuit 24 supplies, according to the ST signal, the electric power to the microcomputer 23, specifically, at least to the CPU 21 and the memory 22. According to this, the CPU 21 in the microcomputer 23 executes the process-at-startup described later, which executing is triggered by the supplying of the electric power.

Further, the CPU 11 sets the detection flag to the set value in this step. In the present embodiment, the CPU 11 sets the detection flag to 1. Further, in this step, the CPU 11 starts a timer and starts measuring the time TA during which the ST signal is asserted (hereinafter, assert time). The timer is included in the function of the microcomputer in advance. Then, the CPU 11 shifts the process to S150.

In S150, the CPU 11 determines whether or not the assert time TA is equal to or greater than a predetermined continuation threshold value. The continuation threshold value may be a suitably-selected value of, for example, several min to several tens of min. The CPU 11 shifts the process to S160 when the assert time TA is equal to or greater than the continuation threshold value, and ends the collation process when the assert time TA is less than the continuation threshold value. The continuation threshold value may be set in consideration of a typical time required to be taken from when the user 100 enters into the reception range R to when the user starts the driving operation, the battery capacity, the electric current consumption of the V2X ECU 20, etc.

In S160, the CPU 11 negates the ST signal output to the V2X ECU20, specifically, to the logical disjunction circuit 25. Further, the CPU 11 sets the detection flag to the reset value. In the present embodiment, the CPU 11 sets the detection flag to 0. Further, the CPU 11 resets the timer. In the present embodiment, when the timer is reset, the assert time TA is reset to 0. With the above, the CPU 11 ends the collation process.

<2-2. Process at Startup>

Figure 4:
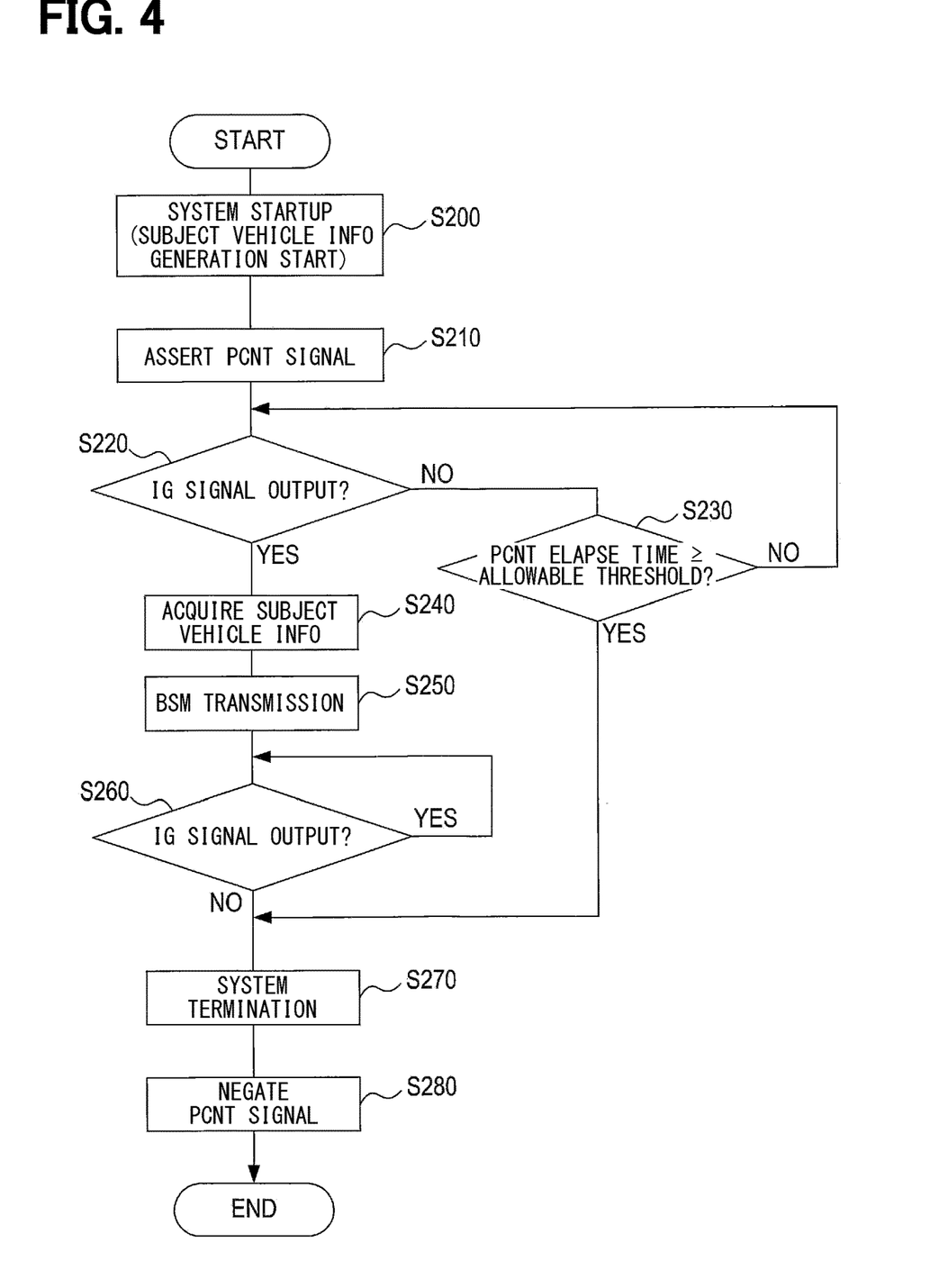
FIG. 4 is a flowchart of a process-at-startup.

Next, the process-at-startup will be described. The process-at-startup is a process executed by the execution device included in the vehicle-mounted device 2. The start of the process-at-startup is triggered by the start of supplying electric power to the execution device. The execution device is configured to, when the supplying of the electric power to the execution device is started, execute the process-at-startup, thereby executing a predetermined designated function according to output of a startup signal.

The startup signal is a signal indicating that the user 100 of the subject vehicle 9 has started up the subject vehicle 9. The startup refers to starting the driving operation. Starting the driving operation refers to starting the engine by pressing down a predetermined start button or turning on an ignition switch. Put differently, the startup signal is a signal indicating that the user 100 of the subject vehicle 9 has started the driving operation. In the present embodiment, the IG signal corresponds to the startup signal. Further, in the present embodiment, the microcomputer 23 corresponds to the execution device as described above, and the below-described function of performing BSM transmission corresponds to the designated function.

In the below, the process-at-startup executed by the CPU 21 in the microcomputer 23 being the execution device will be described with reference to the flowchart of FIG. 4. The process-at-startup is started, which is triggered by the start of supplying electric power to the microcomputer 23. The supplying of electric power to the microcomputer 23 is started by outputting at least the ST signal to the power supply circuit 24 as described above.

The CPU 21 executes system startup in S200. The system startup is what is called a startup process, and refers to performing preparations for various functions provided by the microcomputer. Examples of processes of the system startup may include a process of loading a program stored in the ROM into the RAM, which ROM is included in the memory of the microcomputer.

The CPU 21 asserts a PCNT signal in S210. The PCNT signal is a signal output to the logical disjunction circuit 25. With this, while the PCNT signal is being asserted, the electric power is supplied to the microcomputer 23 including the CPU 21.

In S220, the CPU 21 determines whether or not the IG signal is being output. The CPU 21 shifts the process to S240 when the IG signal is determined as being output, and shifts the process to S230 when the IG signal is determined as not being output. The microcomputer 23 executes a process other than the process-at-startup, so that a PCNT elapsed time TP is measured which is the time period during which the PCNT signal is asserted and the IG signal is not output. The PCNT elapsed time TP is measured by a timer included in the microcomputer 23.

In S230, the CPU 21 determines whether or not the PCNT elapsed time TP is equal to or greater than a given allowable threshold value. The allowable threshold value may be set to, for example, a few min. The CPU 21 shifts the process to S270 when the PCNT elapsed time TP is equal to or greater than the allowable threshold value, and shifts the process to S220 when the PCNT elapsed time TP is less than the allowable threshold value.

In S240, the CPU 21 acquires the subject vehicle information. Then, the CPU 21 shifts the process to S250. The subject vehicle information is repeatedly generated at a predetermined cycle by the CPU 21 executing a process other than the present process-at-startup, and is stored in the memory 22. In this step, the CPU 21 acquires the latest subject vehicle information stored in the memory 22.

In S250, the CPU 21 executes the designated function. Then, the CPU 21 shifts the process to S260. The designated function is a predetermined function that is executed by the execution device being supplied with the electric power and triggered by the start of output of the IG signal. In the present embodiment, the function of performing the BSM transmission corresponds to the designated function.

BSM is an abbreviation for Basic Safety Message. In the present embodiment, at least the subject vehicle information may be included in the BSM. Specifically, the BSM transmission described now refers to transmitting the subject vehicle information using the DSRC transmission and reception unit 60 by the vehicle-to-vehicle communication and the vehicle-to-infrastructure communication. The CPU 21 may be configured to transmit the subject vehicle information together with an identification code that makes it possible to tell the subject vehicle 9 from other vehicles. The identification code may be stored in the memory 22.

In S260, the CPU 21 determines whether or not the IG signal is being output. When it is determined in this that the IG signal is being output, the CPU 21 waits until the IG signal is no longer output. When the IG signal is determined as being no longer output, the CPU 21 shifts the process to S270.

In S270, the CPU 21 performs system termination and shifts the process to S280. The system termination may include a process of storing, in the memory 22, various information that has been generated or acquired in the process-at-startup and that is latest at this time point. In the present embodiment, the various information to be stored in the memory 22 at the system termination may include the latest subject vehicle information and/or different vehicle information at this time point.

The CPU 21 negates the PCNT signal in S280. As a result, the output of the PCNT signal to the logical disjunction circuit 25 is stopped. The CPU 21 ends the process-at-startup.

As described, the execution device is configured so that the system startup is first executed by the process-at-startup. Further, the execution device is configured to, due to the process-at-startup, perform the designated function according to the start of output of the startup signal after the system startup.

3. Operation

The vehicle control system 1 configured as described above operates as follows.

<3-1. Startup of Execution Device>

The CPU 11 in the collation ECU 10 causes the LF wave to be repeatedly output at the above-mentioned execution cycle. The CPU 11 outputs the ST signal being the supply instruction when such a given condition that the portable device 3 is located within the given reception range R from the subject vehicle 9 is satisfied. Specifically, the power supply circuit 24 starts supplying the electric power to the microcomputer 23 being the execution device.

Triggered by the start of the supplying of the electronic power to the microcomputer 23, the microcomputer 23 first performs the system startup. Further, triggered by the start of output of the IG signal after the system startup, the microcomputer 23 executes at least the BSM transmission being the designated function. Specifically, immediately after the output of the IG signal is started, the microcomputer 23 being supplied with the electric power causes the subject vehicle information to be transmitted via the DSRC transmission and reception unit 60.

Further, the CPU 11 in the microcomputer 13 stops the output of the ST signal when the assert time TA, which is the elapsed time from a time when the portable device 3 is detected as being located within the predetermined reception range R from the subject vehicle 9, becomes equal to or larger than the continuation threshold value.

For example, there may be a situation in which the user 100 carrying the portable device 3 enters the reception range R from outside of the reception range R, gets into the subject vehicle 9, and thereafter falls asleep in the subject vehicle 9 and does not start the driving operation. In such a case, if the ST signal is continuously asserted and the electric power is continuously supplied to the microcomputer 23, the battery may run out.

In the present embodiment, the CPU 11 stops the output of the ST signal when the assert time TA exceeds the continuation threshold value, so that the battery run out is suppressed.

In the present embodiment, during a period of the continuous output of the IG signal after the output of the IG signal or during the continuous output of the PCNT after the output of the PCNT signal, the electric power is supplied to the microcomputer 23. Therefore, while the IG signal is being output in this way, or while the PCNT signal is being output in this way, the electric power is supplied to the microcomputer 23 regardless of whether or not the ST signal is output, and the microcomputer 23 causes various functions of the V2X ECU 20 to be performed.

<3-2. Vehicle-to-Vehicle Communication and Vehicle-to-Infrastructure Communication>

While the electric power is being supplied to the microcomputer 23, the microcomputer 23, every several msec to 100 msec, generates the subject vehicle information and acquires different vehicle information. In this way, the vehicle-to-vehicle communication and the vehicle-to-infrastructure communication are performed. Further, the microcomputer 23 calculates a possibility of collision between the subject vehicle and the different vehicle based on the subject vehicle information and the different vehicle information, and issues a notification to the driver to avoid the collision according to the calculation result.

<3-3. Smart Entry Function>

In the operable state, the door ECU 30 unlocks the door in response to, for example, the user 100 touching the door open sensor 81. Further, in the operable state, the door ECU 30 locks the door in response to, for example, the user 100 touching the door lock sensor 82. Further, in the operable state, the collation ECU 10 starts the engine in response to the user 100 pressing the start button. The vehicle control system 1 performs the smart entry function in this way.

4. Effect

According to the embodiment described in detail above, the following effects are obtained.

(4a) The collation ECU 10 in the vehicle-mounted device 2, specifically, the microcomputer 13, is configured to cause at S110 the LF transmission unit 41 to repeatedly output the LF wave being a search radio wave. In S120, the collation ECU 10 repeatedly determines whether or not the identification signal is received from the portable device 3 by the RF reception unit 42. The portable device 3 is a communication device carried by the user of the subject vehicle 9. When the portable device 3 receives the LF wave, the portable device 3 transmits a predetermined identification signal using an RF wave as a carrier wave, which RF wave is a radio wave having a frequency higher than the LF wave.

Thereafter, when it is determined that the identification signal is received from the portable device 3, the collation ECU 10 specifies that the portable device 3 is located within the reception range R which is a predetermined range from the subject vehicle 9. When the portable device 3 is specified as being located within the reception range R from the subject vehicle 9, the collation ECU 10 is configured to in S140 output a supply instruction to the electric power supply unit that supplies electric power to the execution device. The execution device is a predetermined device mounted to the subject vehicle 9, and the electric power supply unit is a device that supplies electric power according to the supply instruction while the supply instruction is being output.

It is typical that electric power is supplied to an execution device after a user of a subject vehicle gets into vehicle interior and starts a driving operation of the subject vehicle, and the execution device starts operating after elapse of a predetermined time period that is necessary for the supplying of the electric power to the execution device, startup of the execution device, etc. When the driving operation is started, output of an IG signal being a startup signal is started.

On the other hand, in the vehicle control system 1, when it is specified that the portable device 3 is located within the predetermined reception range R from the subject vehicle 9, the electric power is supplied to the execution device before the user of the subject vehicle 9 gets into the subject vehicle 9 and starts the driving operation. As described above, when the execution starts being supplied with the electric power, the execution device is configured to perform the system startup first.

As a result, when the user 100 of the subject vehicle 9 gets into the vehicle interior and starts the driving operation of the subject vehicle 9, the electric power has been already supplied to the execution device and the time has passed since the supplying of the electric power, and therefore, it is possible to promptly operate the execution deice after the start of the driving operation of the vehicle.

The operation now referred to includes, after the system startup, the execution device performing, according to the program, predetermined various function assigned to the execution device. The execution device is a device including at least a microcomputer.

In recent years, the size of program has increased due to complexity or the like of functions implemented to the execution device, and the time required for the system startup tends to increase. In the vehicle control system 1, since the electric power is supplied to the execution device in advance before the start of the driving operation as described above, it is possible to promptly operate the execution after the start of the driving operation of the vehicle even if the execution device requires a long time for the system startup.

(4b) In S150, the collation ECU 10 acquires the assert time TA, which is the elapsed time since the portable device 3 was specified to as located within the reception range R from the subject vehicle 9. Then, the collation ECU 10 is configured to determine whether or not the assert time TA is equal to or greater than the continuation threshold value being the time threshold value. In S140, when the assert time T is less than the continuation threshold value, the collation ECU 10 outputs the ST signal being the supply instruction to the power supply circuit 24 being the electric power supply unit. Further, in S160, when the assert time TA is equal to or greater than the continuation threshold value, the collation ECU 10 is configured to stop the output of the ST signal to the power supply circuit 24.

As a result, for example, when a situation occurs in which the user 100 carrying the portable device 3 does not start the driving operation after getting into the subject vehicle 9, it is possible to suppress the battery run out.

(4c) When being supplied with the electric power by the electric power supply unit following the supply instruction, the execution device is configured to execute the predetermined designated function according to the ignition signal serving as the startup signal indicating that the user 100 of the subject vehicle 9 has started up the subject vehicle 9.

As a result, when the user 100 of the subject vehicle 9 starts up the subject vehicle 9, it is possible to promptly execute the designated function of the execution device.

(4d) In the present embodiment, the execution device is the microcomputer 23. The microcomputer 23 is configured to acquire the subject vehicle information being the information on the subject vehicle 9, and cause the DSRC transmission and reception unit to at least transmit the subject vehicle information to at least one of: the different vehicle located around the subject vehicle 9; and the roadside equipment located around the subject vehicle 9.

As a result, the microcomputer 23, which is a device having a function of performing vehicle-to-vehicle communication and vehicle-to-infrastructure communication, can be operated promptly after the start of the driving operation.

(4e) The microcomputer 23 includes at least the function of transmitting subject vehicle information as the above-mentioned designated function.

The microcomputer 23, which is a device having the function of performing the vehicle-to-vehicle communication and the vehicle-to-infrastructure communication, may cause the subject vehicle information to be transmitted promptly after the start of the driving operation of the subject vehicle 9. Specifically, the subject vehicle information may be transmitted within a few sec.

The vehicle-mounted device 2 is configured so that the electric power is supplied to the microcomputer 23 before the start of the driving operation of the subject vehicle 9 and the transmission of the subject vehicle information being the designated function is executed after the start of the driving operation. As a result, because the subject vehicle information is promptly transmitted immediately after the start of the driving operation, it is possible to cause a different vehicle to recognize the subject vehicle 9 immediately after the start of the driving operation. As a result, it becomes possible for the different vehicle to avoid a collision with the subject vehicle 9.

5. Other Embodiments

Although the embodiment of the present disclosure has been described above, the present disclosure is not limited to the above-described embodiment, and it is possible to implement various modifications.

(5a) In the above embodiment, the vehicle-mounted device 2 has functions both of the vehicle-to-vehicle communication and the vehicle-to-infrastructure communication, but this is not limiting. The vehicle-mounted device 2 may have at least one of the vehicle-to-vehicle communication function and the vehicle-to-infrastructure communication function.

(5b) The vehicle-mounted device 2 may be configured to, for example, periodically transmit a radio wave as a search radio wave, which radio wave is provided by modulating the request signal being a given signal using the LF wave as the carrier wave. Then, when the portable device 3 demodulates the received LF wave and the demodulated signal contains the request signal, the portable device 3 may be configured to modulate the identification signal containing a response signal being a given signal in addition to the user ID using the RF wave as a carrier wave and transmit it. Then, when the vehicle-mounted device 2 demodulates the received RF wave and the response signal is contained, the vehicle-mounted device 2 executes the collation of the user IDs.

(5c) The execution device may be configured to execute the designated function on or before the elapse time since the start of the driving operation reaches a given time. For example, after the start of the operation, specifically, after the start of the output of the IG signal, the microcomputer 23 may be configured to execute the above-mentioned designated function within the given time. The given time can be set to a value less than equal to a few sec for example. As a result, the microcomputer 23 surely executes the designated function within a few sec after the start of the driving operation.

(5d) As the designated function, the microcomputer 23 in the vehicle-mounted device 2 may at least have a function of receiving the different vehicle information. As a result, it becomes possible for the subject vehicle 9 to recognize a different vehicle immediately after the start of the driving operation of the subject vehicle 9. The microcomputer 23 may further include, as the designated function, the function of calculating a possibility of collision between the subject vehicle 9 and the different vehicle based on the subject vehicle information and the different vehicle information. This makes it possible that the subject vehicle 9 avoids collision with the different vehicle.

(5e) In the above embodiment, the microcomputer 23 is described as the execution device by way of example, but this is not limiting. The execution device may be a device that is mounted to the subject vehicle 9, includes at least a microcomputer, requires a given time for the system startup, and is provided for performing various functions.

(5f) A plurality of functions of one constituent element in the above embodiments may be implemented by a plurality of constituent elements, or one function of one constituent element may be implemented by a plurality of constituent elements. Further, a plurality of functions of a plurality of constituent elements may be implemented by one constituent element, or one function implemented by a plurality of constituent elements may be implemented by one constituent element. Moreover, the configuration of the above embodiments may be in part omitted. Further, at least part of the configuration of the above-described embodiment may be added to or replaced with the configuration of another embodiment described above.

(5g) The present disclosure enables practice into various forms, including the above-mentioned CPU 11, CPU 21, microcomputer 13, microcomputer 23, collation ECU 10, V2X ECU 20, vehicle-mounted device 2, portable device 3, vehicle control system 1, a program for operating a computer as the CPU 11 and the CPU 21, a non-transitory tangible storage medium storing this program, a startup method for an execution device, etc.

In the above embodiment, the collation ECU 10 corresponds to a vehicle control device. The LF transmission unit 41 corresponds to a transmitter. The RF reception unit 42 corresponds to a receiver. The microcomputer 23 corresponds to an execution device. The power supply circuit 24 corresponds to an electric power supply unit. The DSRC transmission and reception unit 60 corresponds to an information transmission device. The infrastructure device corresponds to roadside equipment. Further, a transmission instruction unit, a portable device detection unit, a supply instruction unit, and a time determination unit correspond to the collation ECU 10. Further, S110 corresponds to processing by the transmission instruction unit. S120 corresponds to processing by the portable device detection unit. S140 and S160 correspond to processing by the supply instruction unit. S150 corresponds to processing by the time determination unit.

Further, the LF wave corresponds to a search radio wave. At least one of the response signal and the user ID corresponds to an identification signal. The IG signal corresponds to a startup signal. Further, asserting the ST signal corresponds to outputting a supply instruction. Negating the ST signal corresponds to stopping output of the supply instruction. The continuation threshold value corresponds to a time threshold value.

What is claimed is:

1. A vehicle control device mounted to a vehicle, comprising:
   a transmission instruction unit configured to cause a transmitter to output a search radio wave, the search radio wave being a radio wave having a predetermined frequency;
   a portable device detection unit configured to:
     repeatedly determine whether a predetermined identification signal from a portable device carried by a user of a subject vehicle being the vehicle to which the vehicle control device is mounted is received by a receiver, the portable device being configured to transmit the identification signal in response to receiving the search radio wave; and
     when it is determined that the identification signal is received, specify that the portable device is located within a reception range being a given range from the subject vehicle;

a time determination unit configured to:
  acquire an elapsed time since the portable device is specified as being located within the reception range from the subject vehicle; and
  determine whether or not the elapsed time is equal to or greater than a predetermined time threshold value;
a supply instruction unit configured to, (i) in response to the portable device being specified as being located within the reception range from the subject vehicle and the elapsed time being less than the time threshold value, output a supply instruction to an electric power supply unit that supplies electric power to a predetermined execution device mounted to the subject vehicle according to the supply instruction, and (ii) in response to the elapsed time being equal to or greater than the time threshold value, stop the output of the supply instruction to the electric power supply unit;
wherein:
the electric power supply unit is configured to begin electric power supply to the execution device according to the supply instruction output from the supply instruction unit;
in a state of being supplied with the electric power by the electric power supply unit according to the supply instruction, the execution device executes a predetermined designated function according to a startup signal indicating that the user of the subject vehicle has started up the subject vehicle, the predetermined designated function being different from a startup operation of the vehicle by the user; and
execution of the predetermined designated function by the execution device includes:
  acquiring subject vehicle information being information on the subject vehicle; and
  causing an information transmission device to transmit the subject vehicle information to at least one of: a different vehicle located around the subject vehicle; and roadside equipment located around the subject vehicle; and
the subject vehicle information includes an identification code for the subject vehicle and the information transmission device transmits the subject vehicle information using a Basic Safety Message (BSM).

2. The vehicle control device according to claim 1, wherein:
the execution device includes a microcomputer executing a function of at least one of vehicle-to-vehicle communication and vehicle-to-infrastructure communication, and
the microcomputer of the execution device is configured to begin a system startup by a process-at-startup in accordance with the supply instruction to the electric power supply unit being output, and to execute the predetermined designated function according to the startup signal.

3. The vehicle control device according to claim 2, wherein the startup operation of the vehicle by the user is a startup operation of an engine of the subject vehicle by the user.

4. The vehicle control device according to claim 1, wherein the roadside equipment includes a traffic signal equipped with a wireless device to transmit traffic signal information.

5. A vehicle control device mounted to a subject vehicle, comprising:
an electronic control unit including a first processor and a first memory, and configured to:
  cause a transmitter to output a search radio wave, the search radio wave being a radio wave having a predetermined frequency;
  repeatedly determine whether a predetermined identification signal from a portable device carried by a user of the subject vehicle is received by a receiver, the portable device being configured to transmit the identification signal in response to receiving the search radio wave;
  when it is determined that the identification signal is received, specify that the portable device is located within a reception range from the subject vehicle;
  acquire an elapsed time since the portable device is specified as being located within the reception range from the subject vehicle and determine whether the elapse time is equal to or greater than a predetermined time threshold value;
  in response to the portable device being specified as located within the reception range from the subject vehicle and the elapsed time being less than the predetermined time threshold, output a supply instruction to a power supply circuit that supplies electric power to a second processor and a second memory of a predetermined microcomputer mounted to the subject vehicle according to the supply instruction; and
  in response to the elapsed time being equal to or greater than the time threshold value, stop the output of the supply instruction to the power supply circuit;
wherein:
the power supply circuit is configured to begin electric power supply to the predetermined microcomputer according to the supply instruction output from the electronic control unit;
in a state of being supplied with the electric power by the power supply circuit according to the supply instruction, the second processor of the predetermined microcomputer executes a predetermined designated function according to a startup signal indicating that the user of the subject vehicle has started up the subject vehicle, the predetermined designated function being different from a startup operation of the subject vehicle by the user,
execution of the predetermined designated function by the predetermined microcomputer includes:
  acquiring subject vehicle information being information on the subject vehicle; and
  causing an information transmission device to transmit the subject vehicle information to at least one of: a different vehicle located around the subject vehicle; and roadside equipment located around the subject vehicle; and
the subject vehicle information includes an identification code for the subject vehicle and the information transmission device transmits the subject vehicle information using a Basic Safety Message (BSM).

6. A vehicle control device mounted to a vehicle, comprising:
a transmission instruction unit configured to cause a transmitter to output a search radio wave, the search radio wave being a radio wave having a predetermined frequency;
a portable device detection unit configured to:
  repeatedly determine whether a predetermined identification signal from a portable device carried by a user of the vehicle is received by a receiver, the portable device being configured to transmit the identification signal in response to receiving the search radio wave; and when it is determined that the identification signal is received, specify that the portable device is located within a reception range being a given range from the subject vehicle; and a supply instruction unit configured to, when the portable device is specified as being located within the reception range from the subject vehicle, output a supply instruction to an electric power supply unit that supplies electric power to a predetermined execution device mounted to the subject vehicle according to the supply instruction;

wherein:

the electric power supply unit is configured to begin electric power supply to the execution device according to the supply instruction output from the supply instruction unit; and the execution device is configured to:
  begin a process-at-startup including a system startup in accordance with beginning of the electric power supply by the electric power supply unit;
  begin to execute a predetermined function, in a state of being supplied with the electric power by the electric power supply unit, according to a startup signal indicating that the user of the subject vehicle has started up the subject vehicle, the predetermined designated function including transmitting subject vehicle information to at least one of: a different vehicle located around the subject vehicle; and roadside equipment located around the subject vehicle;
  output a power control signal to instruct the power supply unit to continue the electric power supply to the execution device in accordance with the beginning of the process-at-startup; and
  keep outputting of the power control signal during a predetermined period in which the startup signal is kept output or until a predetermined allowable time period elapses after the beginning of output of the instruction signal.

\* \* \* \* \*